United States Patent
Erez et al.

(10) Patent No.: US 12,322,121 B2
(45) Date of Patent: Jun. 3, 2025

(54) SATELLITE IMAGERY

(71) Applicant: GSI Technology Inc., Sunnyvale, CA (US)

(72) Inventors: Elona Erez, Tel Aviv (IL); Avidan Akerib, Tel Aviv (IL)

(73) Assignee: GSI Technology Inc., Sunnyvale, CA (US)

( * ) Notice: Subject to any disclaimer, the term of this patent is extended or adjusted under 35 U.S.C. 154(b) by 132 days.

(21) Appl. No.: 17/227,413

(22) Filed: Apr. 12, 2021

(65) Prior Publication Data
US 2021/0334582 A1 Oct. 28, 2021

Related U.S. Application Data

(60) Provisional application No. 63/170,584, filed on Apr. 5, 2021, provisional application No. 63/016,310, filed on Apr. 28, 2020.

(51) Int. Cl.
*G06T 7/254* (2017.01)
*G06F 18/21* (2023.01)
(Continued)

(52) U.S. Cl.
CPC .............. *G06T 7/254* (2017.01); *G06F 18/21* (2023.01); *G06F 18/22* (2023.01); *G06N 3/045* (2023.01);
(Continued)

(58) Field of Classification Search
CPC ........... G06F 18/22; G06N 3/045; G06T 5/50; G06T 2207/10032; G06T 2207/20084;
(Continued)

(56) References Cited

U.S. PATENT DOCUMENTS

2007/0014488 A1* 1/2007 Chen .................. G01C 21/3807
382/294
2018/0158199 A1* 6/2018 Wang ........................ G06T 3/18
(Continued)

FOREIGN PATENT DOCUMENTS

WO WO-2021009141 A1 * 1/2021 ......... G06F 18/2413

OTHER PUBLICATIONS

Kevin Louis de Jong et al, Department of Computer Science University of Pretoria, 2019, "Unsupervised Change Detection in Satellite Images Using Convolutional Neural Networks", arXiv:1812.05815v2 [cs.NE] Mar. 21, 2019.

*Primary Examiner* — Andrae S Allison
*Assistant Examiner* — Emmanuel Silva-Avina
(74) *Attorney, Agent, or Firm* — Heidi Brun Associates Ltd.

(57) ABSTRACT

A system for detecting changes between two temporally different images includes an image divider, a Convolutional Neural Network (CNN) feature encoder, an image alignment system, a feature comparator, a CNN feature decoder and segmenter, and a block combiner. The image divider divides a first and second image into a plurality of image blocks. CNN feature encoder encodes the image blocks from the first and second image into first and second feature sets respectively. The image alignment system aligns the first and second image by searching for matching anchor vectors in the first and second feature sets using a similarity search. The feature comparator produces change feature sets from the first and second feature sets of the aligned image blocks, and the CNN feature decoder and segmenter creates segmented change image blocks from the change feature sets. The block combiner combines segmented change image blocks into a segmented change image.

10 Claims, 8 Drawing Sheets

(51) Int. Cl.
G06F 18/22 (2023.01)
G06N 3/045 (2023.01)
G06N 3/08 (2023.01)
G06T 5/50 (2006.01)
G06T 7/11 (2017.01)
G06T 7/33 (2017.01)
G06V 10/50 (2022.01)
G06V 10/75 (2022.01)
G06V 10/82 (2022.01)
G06V 20/13 (2022.01)

(52) U.S. Cl.
CPC .............. G06T 5/50 (2013.01); G06T 7/11 (2017.01); G06T 7/33 (2017.01); G06V 10/50 (2022.01); G06V 10/75 (2022.01); G06V 10/82 (2022.01); G06V 20/13 (2022.01); G06N 3/08 (2013.01); G06T 2207/10032 (2013.01); G06T 2207/20021 (2013.01); G06T 2207/20084 (2013.01); G06T 2207/20221 (2013.01)

(58) Field of Classification Search
CPC . G06T 2207/30184; G06T 2207/20021; G06T 7/33; G06T 7/11; G06V 10/82; G06V 10/40; G06V 20/13
USPC ......................................................... 382/173
See application file for complete search history.

(56) References Cited

U.S. PATENT DOCUMENTS

2020/0065629 A1* 2/2020 Kennedy ............... G06F 18/217
2020/0125822 A1* 4/2020 Yang ...................... G06Q 50/02
2020/0401617 A1* 12/2020 Spiegel ................. G06F 16/587
2021/0383546 A1* 12/2021 Kaneko ..................... G06T 7/11
2022/0245936 A1* 8/2022 Valk ..................... G06V 10/764

* cited by examiner (PRIOR ART)
FIG. 1

| BLOCK$_{t1,i}$ | BLOCK$_{t0,i}$ | ANCHOR? |
|---|---|---|
| 1 | 9 | ✓ |
| 2 | 10 | ✗ |
| 3 | 11 | ✓ |
| 4 | 12 | ✓ |
| ⋮ | ⋮ | ⋮ |
| n | | |

| BLOCK$_{sc,i}$ | PIXEL$_{i,p}$ | SEGMENT$_{i,s}$ | CATEGORY | SUB-CATEGORY |
|---|---|---|---|---|
| 22 | 41 | 3 | VEHICLE | SUV |
| 22 | 47 | 3 | VEHICLE | SUV |
| 22 | 62 | 3 | VEHICLE | SUV |
| 22 | 226 | 8 | SURFACE | ROAD |
| ⋮ | ⋮ | ⋮ | ⋮ | ⋮ |
|  |  |  |  |  |

FIG. 9

SATELLITE IMAGERY

CROSS REFERENCE TO RELATED APPLICATIONS

This application claims priority from U.S. provisional patent applications 63/016,310 filed Apr. 28, 2020 and 63/170,584 filed Apr. 5, 2021, which are incorporated herein by reference.

FIELD OF THE INVENTION

The present invention relates to similarity search generally and to satellite imagery in particular.

BACKGROUND OF THE INVENTION

Utilizing Deep Neural Networks (DNNs) to detect changes in spatially similar, but temporally different, high-definition satellite images is known. Kevin Louis de Jong et al, Department of Computer Science University of Pretoria, 2019 in the paper Unsupervised Change Detection in Satellite Images Using Convolutional Neural Networks discusses using a Convolutional Neural Network (CNN) to detect changes between correlated portions of a satellite image and the detection of the nature of the change in the image. For example, two images of the same place taken months apart, may reveal the addition of a new building in the later image. De Jong et al note that this change imagery has applications in agricultural, civil and military fields.

The trained CNN, in this example U-net, has an encoder and a decoder. De Jong inputs a portion of a high-definition satellite image into the encoder and, through a process of convolution and compression, encodes the portion into feature sets. A feature comparator can take two temporally different image portions and create a feature set that contains only the changes between the two image portions. The decoder, through a process of deconvolution and up-sampling, transforms this change feature set into an image that contains only the significant changes between the earlier and later image portions. The decoder also segments the content of such a change image into categories.

Figure 1:
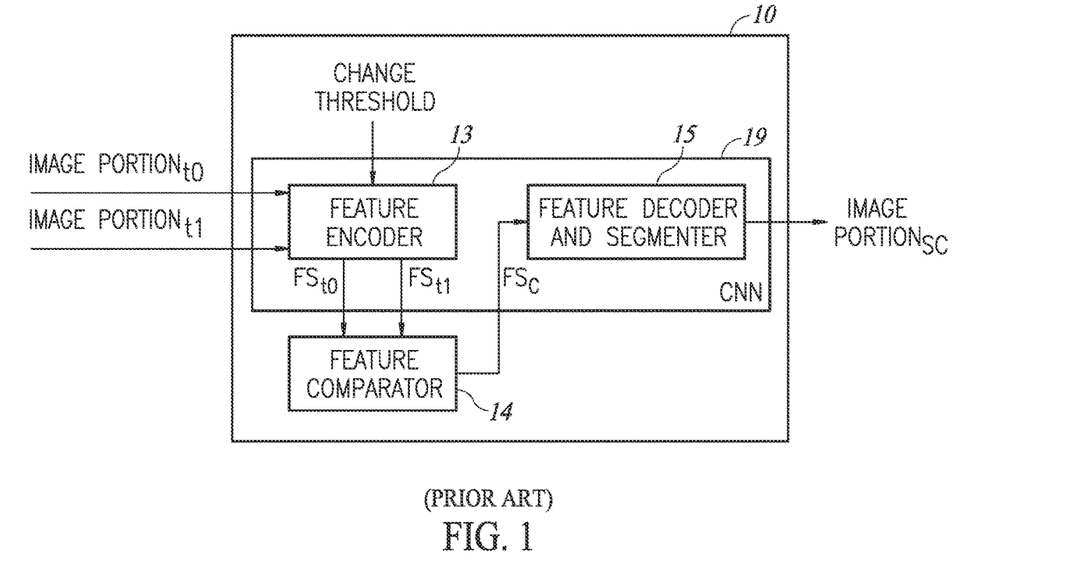
FIG. 1 is an illustration of a satellite image differencer system.
Figure 2:
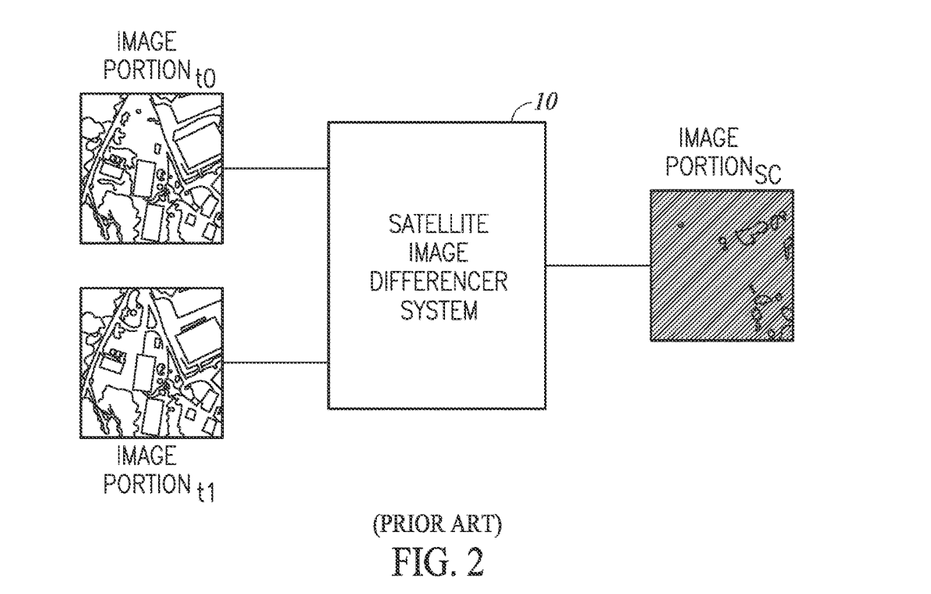
FIG. 2 is an illustration of the input and output images of a satellite image differencer system.

Reference is made to FIGS. 1 and 2 which illustrate a satellite image differencer system 10 implementing De Jong's method. Satellite image differencer system 10 comprises a feature encoder 13, a feature comparator 14, and a feature decoder and segmenter 15. Feature encoder 13 and feature decoder and segmenter 15 are implemented on a CNN 19.

Two image portions; image portion$_{t0}$ and image portion$_{t1}$, from temporally different, high-definition satellite images, as shown in FIG. 2, are input into feature encoder 13 which encodes them into two feature sets; $fs_{t0}$ and $fs_{t1}$ respectively. Feature comparator 14 creates a change feature set $fs_c$ which contains only those feature sets $fs_{t1}$ that have changed between to and $t_1$, and whose change is above a predefined no-change threshold.

Through a process of deconvolution and up-sampling, feature decoder and segmenter 15 creates a change image portion, image portion that only indicates areas where significant changes have occurred between $t_0$ and $t_1$, other areas are blank, or as shown in output image of FIG. 2 they are colored white. False positive areas of change, may appear at the edges of change image portions as a result of the convolution process, also shown in the output image in FIG. 2.

Decoder and segmenter 15 also extracts the category information from the change feature sets and may produce a segmented change image, image portion$_{sc}$, as shown in FIG. 2. In this segmented image portion, categories that have been trained into CNN 19 can be applied to the different segments of the image. In the change image, different categories may be segmented into different colors, and for example, a building that has been built since the previous image was taken, may be colored black. The decoder also tags the changed segment metadata with the tag building.

It should be noted that a number of distortions may affect the appearance of any image; such visual noise in images is produced as a result of shadows, atmospheric and weather-related conditions. The impact of such distortions may be to cause feature comparator 14 to detect change between two temporally different images when no change is present. In order to reduce the effects of such distortions, images may undergo visual filtering and correction. Another method to reduce the impact of insignificant changes between images, as mentioned hereinabove, is to use a predefined no-change threshold. Careful calculation of such a threshold allows some level of difference between images to occur, as a result of distortions, without the change being deemed significant. This reduces the number of false-positive changed images appearing in the change image.

The unsupervised nature of the system enables the system to monitor change images and segments, and only when, for example, there is an increase of certain classes of object, such as vehicles or buildings, will the system notify users of what is seen as substantive change.

SUMMARY OF THE PRESENT INVENTION

There is provided, in accordance with a preferred embodiment of the present invention a system for detecting changes between two temporally different images, the system including an image divider, a Convolutional Neural Network (CNN) feature encoder, an image alignment system, a feature comparator, a CNN feature decoder and segmenter, and a block combiner.

The image divider divides a first image into a plurality of image blocks, and divides a second image into a plurality of image blocks. The Convolutional Neural Network (CNN) feature encoder encodes the image blocks from the first image into first feature sets, and encodes the image blocks from the second image into second feature sets. The image alignment system aligns the first image and the second image by searching for matching anchor vectors in the first feature sets and the second feature sets using a similarity search. The feature comparator produces change feature sets from the first and second feature sets of the aligned image blocks and the CNN feature decoder and segmenter creates segmented change image blocks from the change feature sets. The block combiner combines a plurality of the segmented change image blocks into a segmented change image.

Additionally, in accordance with a preferred embodiment of the present invention, the first and second images are temporally different, but spatially similar, high resolution satellite images.

Further, in accordance with a preferred embodiment of the present invention, the similarity search is a K nearest neighbor search.

Still further, in accordance with a preferred embodiment of the present invention, the similarity search uses one of Euclidian, cosine, Hamming, or L1 distance metrics.

Moreover, in accordance with a preferred embodiment of the present invention, the change feature sets include those of the second feature sets where changes between the first image and the second image exist.

Additionally, in accordance with a preferred embodiment of the present invention, the feature comparator operates on feature sets of non-anchor image blocks.

There is provided, in accordance with a preferred embodiment of the present invention a system to align two images, the system including a feature set database, an anchor block searcher, an image aligner, and a block tabulator.

The feature set database stores candidate feature sets extracted from image blocks of a first image, and the anchor block searcher identifies anchor blocks by searching for the candidate feature sets that match a query feature set extracted from an image block from a second image, using a similarity search. The image aligner aligns the anchor blocks in the first image and the anchor blocks in the second image, hence aligning the first image and the second image, and the block tabulator correlates and tabulates image blocks from the first aligned image and image blocks from the second aligned image.

Additionally, in accordance with a preferred embodiment of the present invention, the extracted feature sets are extracted from hidden layers of a CNN image encoder.

Further, in accordance with a preferred embodiment of the present invention, the anchor block searcher compares matches against a predefined matching threshold t.

Still further, in accordance with a preferred embodiment of the present invention, the block tabulator designates correlated image blocks as one of anchor vectors or non-anchor vectors.

There is provided, in accordance with a preferred embodiment of the present invention a system to refine segmented image categories, the system including, a pixel feature set extractor, a known sub-category database, a pixel feature set searcher, and a sub-category assigner.

The pixel feature set extractor extracts pixel level feature sets corresponding to segmented image blocks, the segmented image blocks having data and category metadata. The known sub-category database stores known sub-category feature sets extracted from segmented images with known sub-categories. The pixel feature set searcher matches query pixel feature sets to candidate known sub-category feature sets using a similarity search, and the sub-category assigner adds sub-category metadata to the segmented image block metadata.

Additionally, in accordance with a preferred embodiment of the present invention, the pixel feature set extractor extracts the pixel feature sets from final hidden layers of a CNN decoder and segmenter.

There is provided in accordance with a preferred embodiment of the present invention, a method for detecting changes between two temporally different images. The method includes dividing a first image into a plurality of first image blocks, and dividing a second image into a plurality of second image blocks, encoding the first image blocks into first feature sets, and encoding the second image blocks into second feature sets, and aligning the first image and the second image by searching for matching anchor vectors in the first feature sets and the second feature sets using a similarity search. The method also includes encoding a first correlated image block into a first feature set, and encoding a second correlated image block into a second feature set, producing a change feature set from the first and second feature sets of the aligned image blocks, decoding and segmenting the aligned image blocks to create a segmented change image block from the change feature set, and combining a plurality of the segmented change image blocks into a segmented change image.

Moreover, in accordance with a preferred embodiment of the present invention, the change feature set include those of the second feature sets where changes between the first image and the second image exist.

Additionally, in accordance with a preferred embodiment of the present invention, producing is performed on feature sets of non-anchor vectors.

There is provided in accordance, with a preferred embodiment of the present invention, a method to align two images. The method includes storing candidate feature sets extracted from image blocks of a first image, identifying anchor blocks by searching for the candidate feature sets that match a query feature set extracted from an image block from a second image, using a similarity search, aligning the anchor blocks in the first image and the anchor blocks in the second image, thereby aligning the first image and the second image, and correlating and tabulating image blocks from the first aligned image and image blocks from the second aligned image blocks.

Moreover, in accordance with a preferred embodiment of the present invention, searching compares matches against a predefined matching threshold.

Additionally, in accordance with a preferred embodiment of the present invention, correlating and tabulating designates correlated image blocks as one of anchor vectors and non-anchor vectors.

There is provided in accordance, with a preferred embodiment of the present invention, a method to refine segmented image categories. The method includes extracting pixel feature sets corresponding to segmented image blocks, the segmented image blocks having data and category metadata, storing known sub-category feature sets extracted from segmented images with known sub-categories, matching query pixel feature sets to candidate known sub-category feature sets using a similarity search, assigning sub-categories to the matched feature sets, and adding sub-category metadata to the stored segmented image block metadata.

Moreover, in accordance with a preferred embodiment of the present invention, the segmented image block data and metadata are output from a CNN decoder.

Additionally, in accordance with a preferred embodiment of the present invention, the pixel feature sets are extracted from final hidden layers of the CNN decoder.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that in real-life, spatially similar but temporally different satellite images may not be aligned. Hence, before accurate change images can be produced by a trained CNN, images may require alignment. Moreover, De Jong does not address the challenges of aligning real, temporally different, high-definition satellite images.

Applicant has realized that a similarity search may be used to identify similar image blocks within spatially similar but temporally different first and second images. A number of such similar image blocks may become anchor-blocks, used to calculate the alignment between such first and second images as explained hereinbelow.

Figure 3:
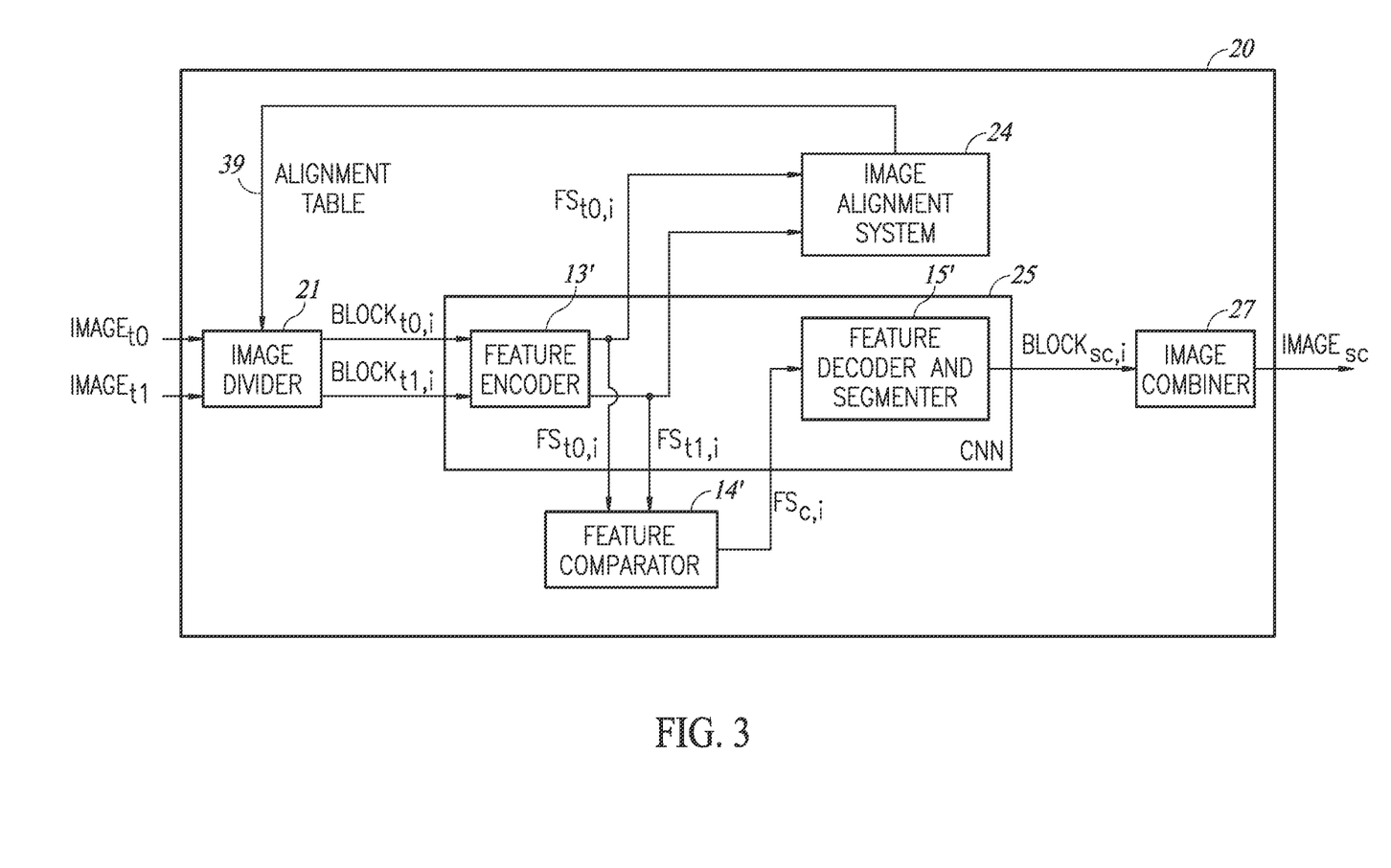
FIG. 3 is an illustration of a satellite image change system.

Reference is now made to FIG. 3 which illustrates a satellite image change system 20, constructed and operative in accordance with the present invention. System 20 comprises an image divider 21 to divide high-definition images into smaller image blocks, a feature encoder 13' to encode image blocks into feature sets, an image alignment system 24 to align a first image, $image_{t0}$, and a second image, imaged, a feature comparator 14' to produce a change feature set, a feature decoder and segmenter 15' to produce a segmented change image block, and a block combiner 27 to combine multiple segmented change image blocks into a single segmented change image.

Feature encoder 13' and feature decoder and segmenter 15' may be implemented on a CNN 25, similar to CNN 19 in FIG. 1.

Image divider 21 may divide two spatially similar but temporally different, high-definition satellite images; $image_{t0}$ and $image_{t1}$, into smaller image blocks; $block_{t0,i}$ and $block_{t1,i}$. Image blocks $block_{t0,i}$ and $block_{t1,i}$ are then encoded by feature encoder 13' into feature set $fs_{t0,i}$ and feature set$_{t1,i}$, respectively. Image alignment system 24 may utilize these feature sets to align the two images, $image_{t0}$ and $image_{t1}$, by aligning image blocks within the two images. When $image_{t0}$ and $image_{t1}$ have been aligned, image alignment system 24 may attempt to correlate all image blocks, $block_{t0,i}$ of first image, $image_{t0}$, with their associated blocks, $block_{t1,i}$, of second image $image_{t1}$. For example, image alignment system 24 may correlate $block_{t0,22}$ with $block_{t1,35}$, that is, may associate block 22 from $image_{t0}$ with block 35 from $image_{t1}$. This is repeated for all image blocks, $block_{t0,i}$ and $block_{t1,i}$. The results of such a correlation may be tabulated by image alignment system 24 and the results used by image divider 21 to feed correlated blocks for encoding by feature encoder 13' and comparison by feature comparator 14'.

Reference is now made to FIGS. 4 and 5A, 5B, 5C, 5D and 5E which illustrate image alignment system 24 and the process of aligning spatially similar but temporally different first and second images. System 24 comprises a feature set database 26, an anchor block searcher 28, an image aligner 32, and a block tabulator 34.

Figure 5A:
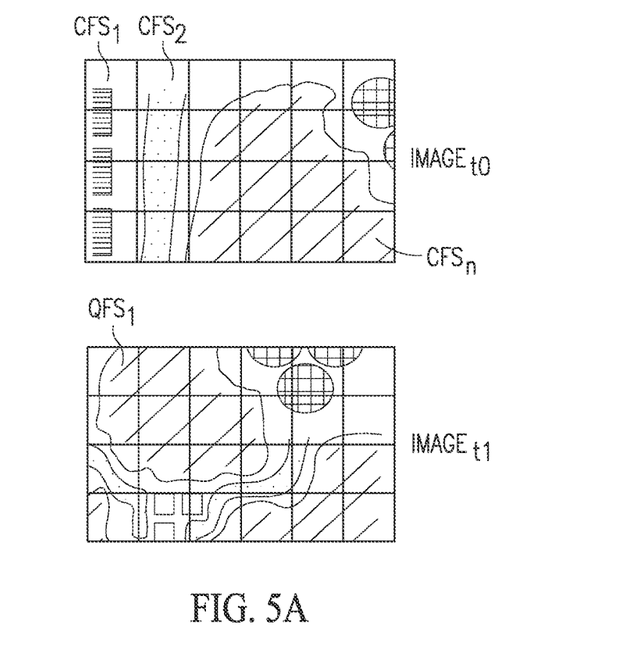
FIGS. 5A, 5B, 5C, 5D and 5E are illustrations of the process of aligning spatially similar but temporally different first and second images.

Feature set database 26 may receive feature sets from feature encoder 13' which may encode all image blocks, $block_{t0,i}$, from a first image $image_{t0}$, into candidate feature set vectors $cfs_i$, and may store them in database 26. Feature encoder 13' may then encode the image blocks $block_{t1,i}$ from second image, $image_{t1}$, into query feature set vectors $qfs_i$ as shown in FIG. 5A. FIG. 5A labels each block with its feature set $cfs_i$; thus, first image, $image_{t0}$, is shown with block feature sets, $cfs_1$ to $cfs_n$.

Figure 4:
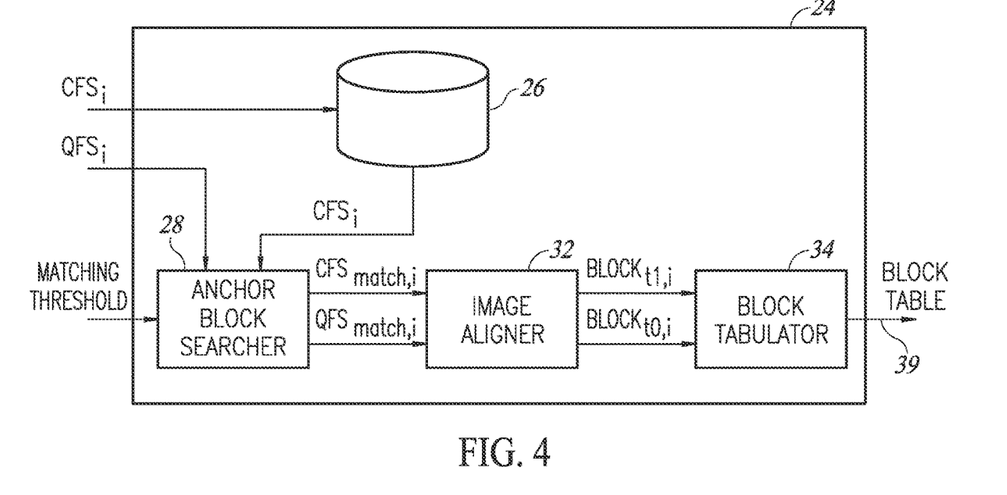
FIG. 4 is an illustration of an image alignment system.

Anchor block searcher 28 may perform a similarity search, for example, a K nearest neighbor search using distance metrics such as Euclidian, cosine, Hamming, or L1 distances, between a first query vector $qfs_i$ and all candidate vectors $cfs_i$.

Figure 5B:
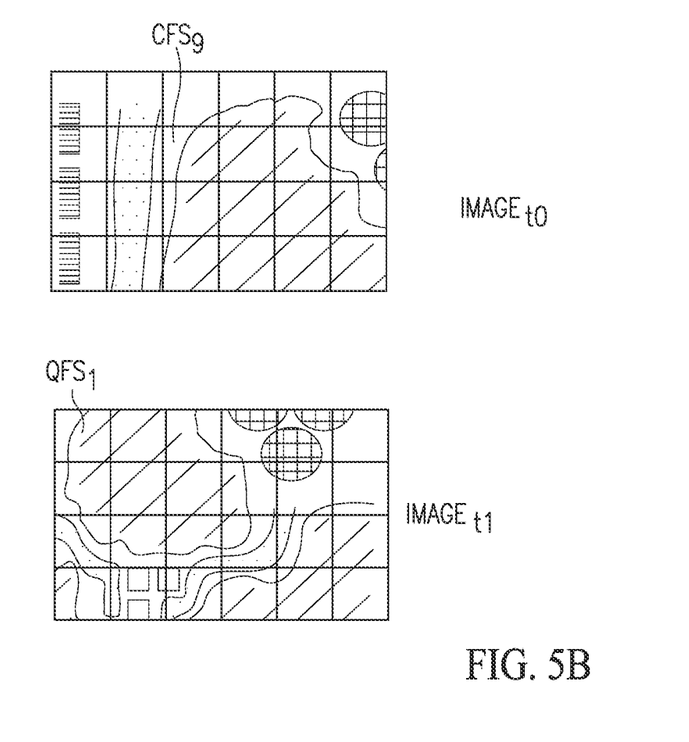

If anchor block searcher 28 identifies a match between first query vector $qfs_i$ and a candidate vector $cfs_i$ within a predefined matching threshold, it may tag the vectors as a pair of anchor vectors. As shown in FIG. 5B, $qfs_1$ is matched with $cfs_9$, and they are tagged as a match. The anchor vectors identify that similar image blocks appear in images, $image_{t0}$ and $image_{t1}$, and specifically where in each image they are located. Anchor block searcher 28 may perform a number of searches, until a plurality of anchor vector pairs are identified, enough for image aligner 32 to align $image_{t0}$ and $image_{t1}$, as indicated in FIG. 5C, which shows the pair of images, $image_{t0}$ and $image_{t1}$, aligned one upon the other.

It should be noted that anchor vectors may be required to be significantly similar to one another to be used for aligning two images. As anchor block searcher 28 uses a similarity search to identify two matching image blocks in two temporally different images, the most similar found in a search, may not be significantly similar. This could be as a result of both image blocks containing similar content, like trees or grass, but not representing the same spatial image. Another case could be where two spatially similar images have a difference. In order to be an anchor block, the nearest match is not enough, the match must be within a predefined threshold to deem the two image blocks close enough to be anchor blocks.

Figure 5C:
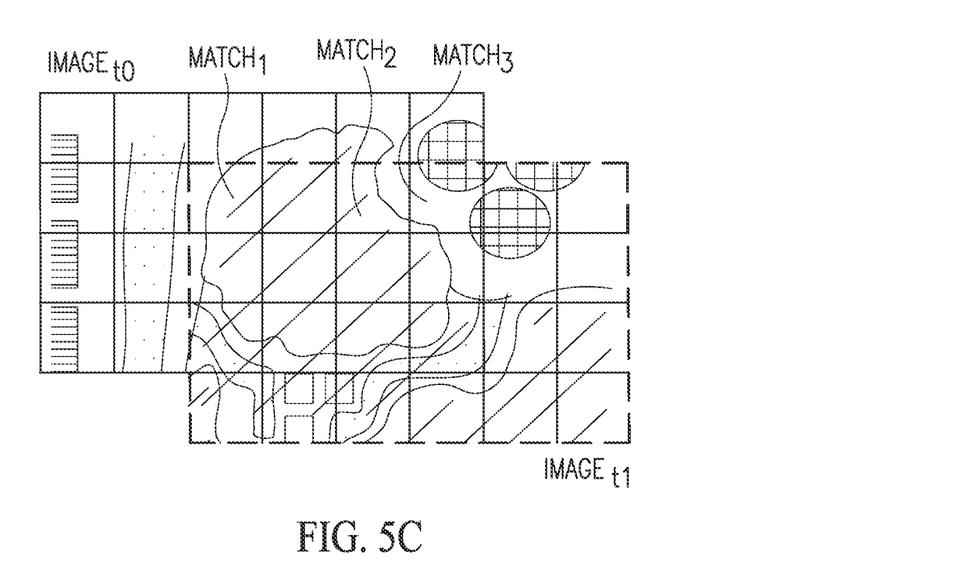

It should be noted that if anchor block searcher 28 cannot identify a candidate $cfs_i$, it may be that the block represented by query vector $qfs_i$ has changed significantly from the first to second image or, as shown in FIG. 5C, doesn't exist in the first image. In this case, anchor block searcher 28 may determine that query vector $qfs_i$ cannot be used in this phase of aligning the two images and may repeat the process with a different query vector $qfs_i$, until a sufficient set of anchor vector pairs are identified.

As can be seen in FIG. 5C, image $image_{t1}$ is shifted two blocks to the right and one block down from image $image_{t0}$.

Figure 5D:
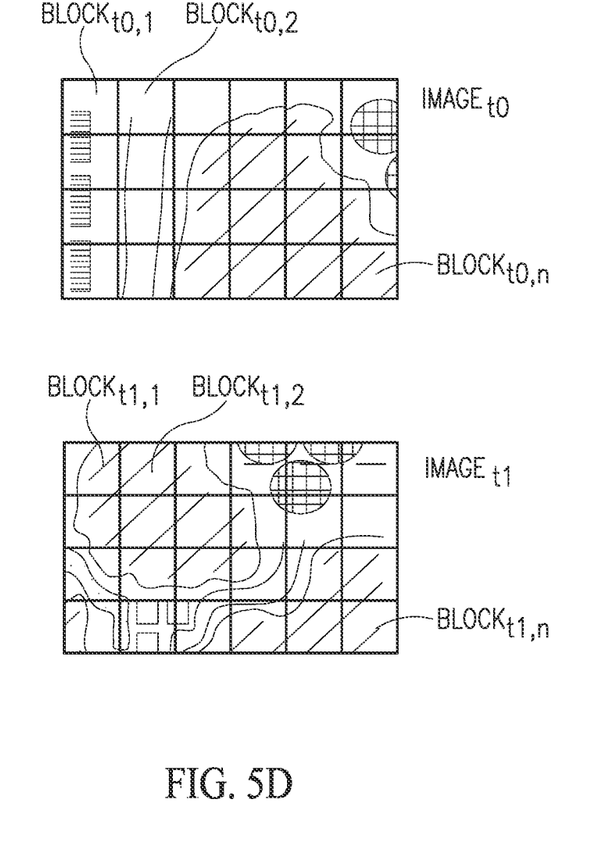
Figure 5E:
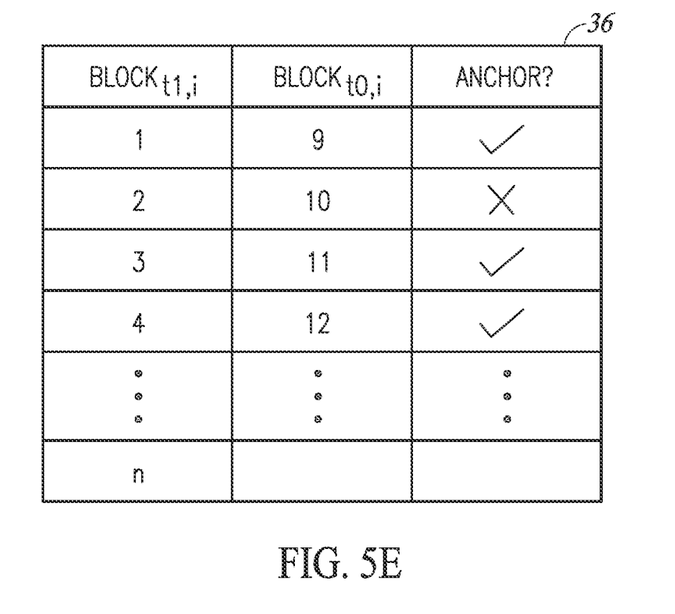

As shown in FIGS. 5D and 5E, all blocks, $block_{t0,i}$ and $block_{t1,i}$, from both images, $image_{t0}$ and $image_{t1}$, may be correlated and tabulated by block tabulator 34, and written to alignment table 36. Tabulator 34 may also denote which blocks are anchor blocks and which are non-anchor blocks.

Alignment table 36 may be used by image divider 21 to send correlated block pairs to feature encoder 13' and subsequently by feature comparator 14' to look for changes between $block_{t0,i}$ of first image, $image_{t0}$, and $block_{t1,i}$ of second image $image_{t1}$. Feature comparator 14' produces a change feature set $fs_{c,i}$ similar to feature comparator 14 in FIG. 1. Feature decoder and segmenter 15' uses change feature set $fs_{c,i}$ to produce a segmented change image block, $block_{sc,i}$ similar to feature decoder and segmenter 15 in FIG. 1. A plurality of segmented image blocks, $block_{sc,i}$ are combined into a segmented change image, $image_{sc}$ by image combiner 27.

It should be noted that, since anchor blocks have already been deemed to be significantly similar by block searcher 28, image divider 21 may not send blocks designated as anchor blocks to feature encoder 13'. Applicant has realized that feature encoder 13' may produce feature sets for feature comparator 14' to find differences therein; if the blocks are deemed similar in advance, there is no reason to process them further.

Applicant has realized that similarity searches between query feature sets and a plurality of candidate feature sets may be performed on GSI Technology Inc's Gemini Associative Processing Unit (APU) with a complexity O (1). As a result, the speed of such searches is not a function of the number of candidate vectors, which makes them ideal for very large datasets, such as the plurality of blocks of high-definition satellite images.

Refined-categorization is a process by which segmented image categories are further refined in to sub-categories. For example, as mentioned herein above, a CNN may output a segmented image containing vegetation, buildings, hard surfaces (roads) and vehicles. A refined categorization may further divide vehicles into types of vehicles, such as family cars, SUVs, 18-wheeler trucks and delivery trucks.

Applicant has realized that refined-categorization of segmented images is computationally expensive. In order to recognize sub-categories, CNNs need to be trained with datasets of identified sub-categories. This data may be expensive to acquire, be unavailable, or be difficult and time consuming to produce in the quantities required and of sufficient quality to train a CNN. Applicant has further realized that feature sets of segmented images may be compared to known sub-category feature sets using a similarity search.

Figure 6:
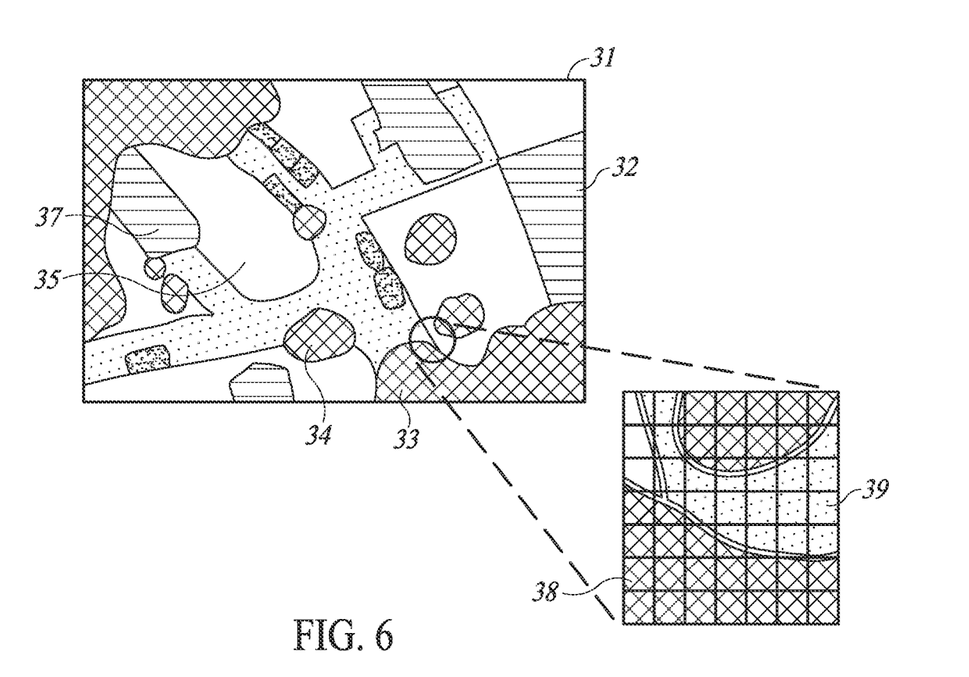
FIG. 6 is an illustration of components of an image block.

Image blocks, $block_{sc,i}$, that are output by satellite image change system 20 explained hereinabove, may comprise a plurality of image segments, each comprising a plurality of pixels. Reference is briefly made to FIG. 6, which illustrates an image block 31, image segments 32-37, and pixels 38 and 39. Shading of segments represent the categories of each segment, encoded by CNN 25. Shading represents categories of trees, grass, hard surfaces, vehicles and buildings. It can be seen that a plurality of pixels may be part of a segment, and a plurality of segments may be part of an image block. There may be a plurality of similar segments in an image block.

In a preferred embodiment of the present invention, segments in a change image block, $block_{sc,i}$, that has been produced by satellite image change system 20 may be compared to segments from known sub-categories using a similarity search.

Figure 7:
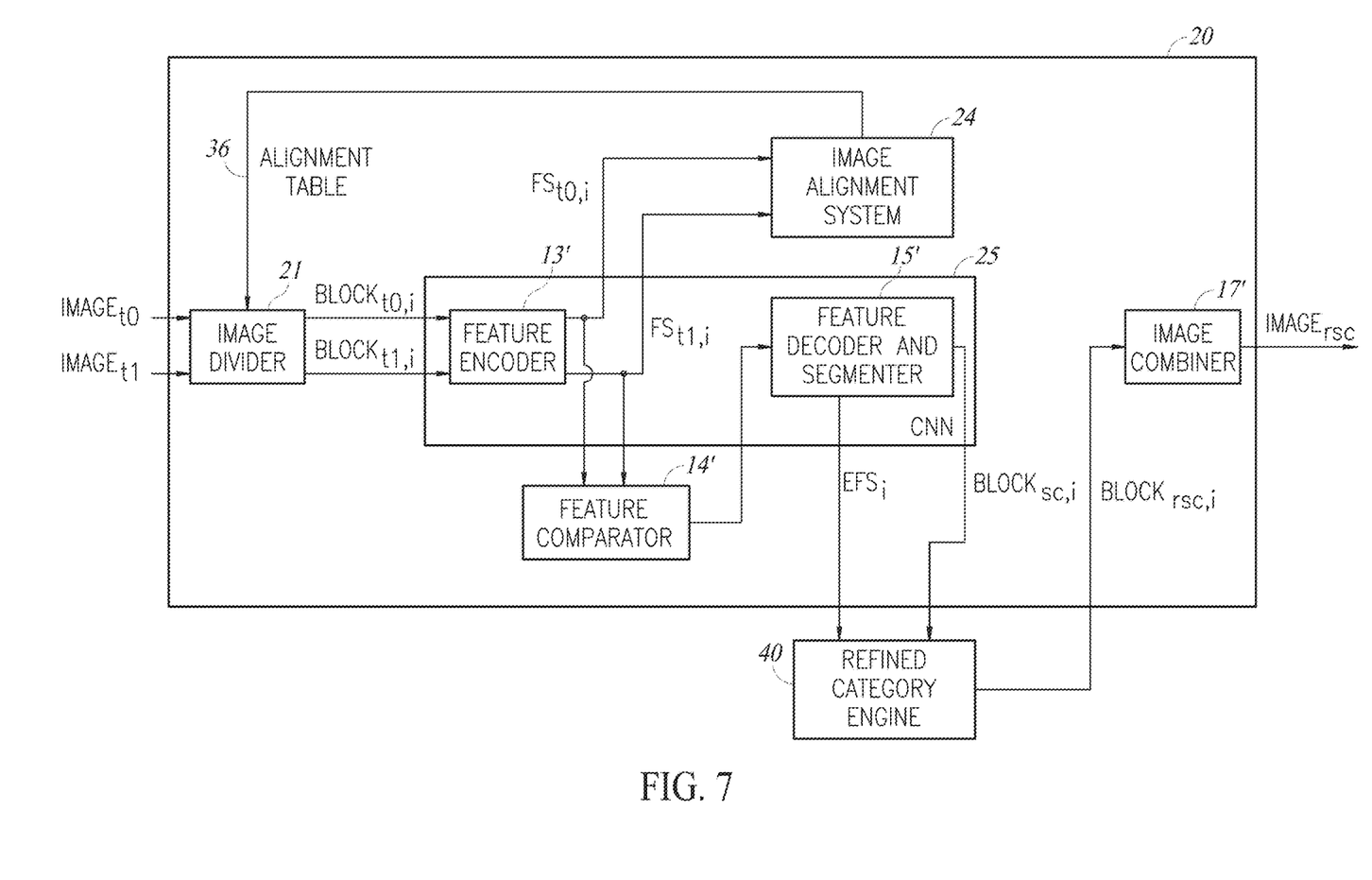
FIG. 7 is an illustration of previous satellite image change system with the addition of a refined-category engine.

Reference is briefly made to FIG. 7 which illustrates previous satellite image change system 20 with the addition of a refined-category engine 40 to further refine the categorization of segmented images output by satellite image change system 20.

Figure 8:
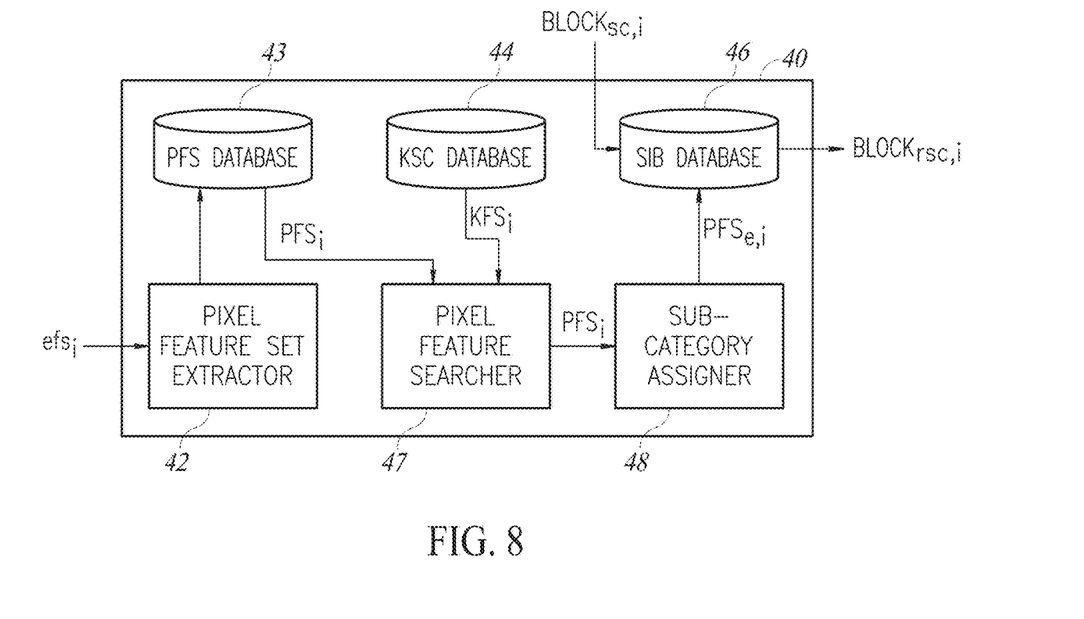
FIG. 8 is an illustration of a refined-category engine.

Reference is now made to FIG. 8 which illustrates refined-category engine 40 comprising a pixel feature set extractor 42, an pixel feature set (PFS) database 43, a known sub-category (KSC) database 44, a segmented image block (SIB) database 46, a pixel feature searcher 47, and a sub-category assigner 48.

Figure 9:
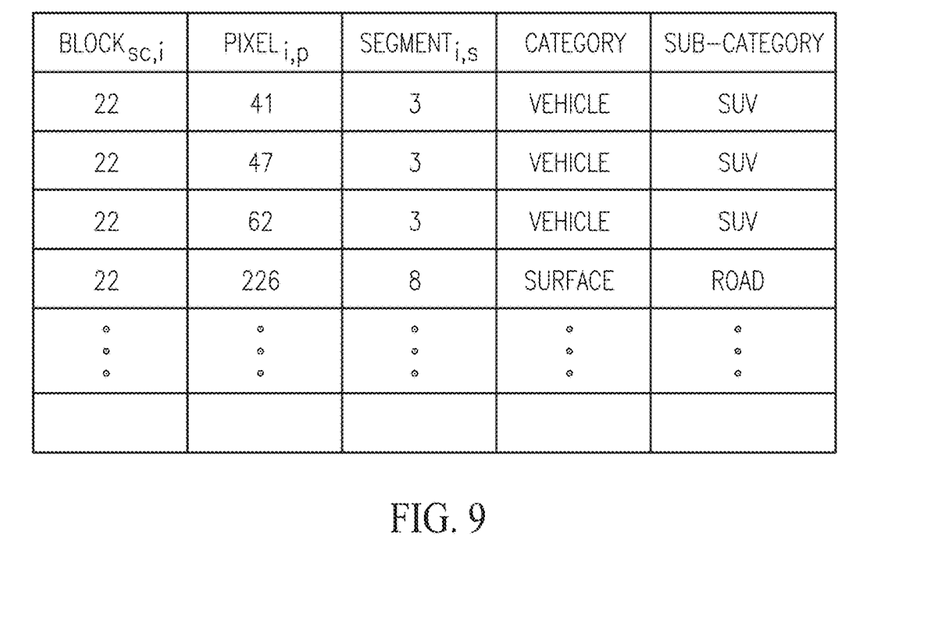
FIG. 9 is an illustration of a portion of the data in the segmented image block database.

Segmented and categorized image $block_{sc,i}$ may be output by feature decoder and segmenter 15' of satellite image change system 20 and may be stored in SIB database 46. Reference is briefly made to FIG. 9 which illustrates a portion of the data stored in SIB database 46. For each $pixel_{i,p}$ in $block_{sc,i}$, its corresponding segment, $segment_{i,s}$, its category and sub-category are stored. It should be noted that sub-category metadata is not calculated by satellite image change system 20. Sub-category information may be calculated by refined-category engine 40, as explained hereinbelow.

Pixel feature set extractor 42 may extract pixel level feature set $pfs_i$ corresponding to $block_{sc,i}$, from the final hidden layers of feature decoder and segmenter 15' and may store them in PFS database 43. Pixel feature set $pfs_i$ may comprise the pixel level feature sets that are associated with the output segmented image $block_{sc,i}$. Pixel feature searcher 47 may use pixel feature sets $pfs_i$ as query vectors in a similarity search. Pixel feature searcher 47 may compare query vectors $pfs_i$ with candidate known sub-category features set vectors $ksc_i$, stored in KSC database 44, using a similarity search such as a K nearest neighbor search, using distance metrics such as Euclidian, cosine, Hamming, or L1 distance. When $pfs_i$ and $ksc_i$ vectors are deemed similar, sub-category assigner 48 may add new sub-category metadata, $pfse_{i,j}$, to $pixel_{i,p}$.

To increase the accuracy of sub-category search results, pixel feature searcher 47 may perform a plurality of searches using a plurality of $pfs_i$ vectors from a single segment, $segment_{i,s}$, and may employ statistical techniques to determine which sub-category to assign to each $segment_{i,s}$ and $pixel_{i,p}$.

Refined category, segmented images blocks, $block_{rsc,i}$ may be output to image combiner 17', to produce a refined category, segmented image, $image_{rsc}$.

Applicant has realized that, by adding refined-category engine 40 to satellite image change system 20, objects which have changed may easily be identified, with a complexity of O(1).

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type, such as a client/server system, mobile computing devices, smart appliances, cloud computing units or similar electronic computing devices that manipulate and/or transform data within the computing system's registers and/or memories into other data within the computing system's memories, registers or other such information storage, transmission or display devices.

Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general-purpose computers may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for detecting changes between two temporally different images, the system comprising:
    an image divider to use a grid to divide a first satellite image into a plurality of first satellite image blocks, and to divide a second satellite image, which is spatially similar but temporally different from said first satellite image, into a plurality of second satellite image blocks;
    a Convolutional Neural Network (CNN) feature encoder to encode said first satellite image blocks into first block feature sets, and to encode said second satellite image blocks into second block feature sets;
    an image alignment system to identify as pairs of anchor blocks those first block feature sets and second block feature sets which match within a predefined threshold according to a similarity search and to use a plurality of said pairs of anchor blocks and their locations within said first satellite image and said second satellite image to align said first satellite image and said second satellite image;
    a feature comparator to produce change feature sets from said first and second block feature sets of said aligned image blocks;
    a CNN feature decoder and segmenter to create segmented change image blocks from said change feature sets; and
    a block combiner to combine a plurality of said segmented change image blocks into a segmented change image.

2. The system of claim 1, wherein said similarity search is a K nearest neighbor search.

3. The system of claim 2 wherein said similarity search to use one of: Euclidian, cosine, Hamming, and L1 distance metrics.

4. The system of claim 1 wherein said change feature sets comprise those of said second block feature sets where changes between said first satellite image and said second satellite image exist.

5. The system of claim 1, said feature comparator to operate on block feature sets of non-anchor image blocks.

6. A method for detecting changes between two temporally different images, the method comprising:
    using a grid to divide a first satellite image into a plurality of first satellite image blocks, and dividing a second satellite image, which is spatially similar but temporally different from said first satellite image, into a plurality of second satellite image blocks;
    encoding said first satellite image blocks into first block feature sets, and encoding said second satellite image blocks into second block feature sets;
    identifying as pairs of anchor blocks those first block feature sets and second block feature sets which match within a predefined threshold according to a similarity search;
    aligning said first satellite image and said second satellite image using said pairs of anchor blocks and their locations within said first satellite image and said second satellite image;
    encoding a first correlated image block into a first block feature set, and encoding a second correlated image block into a second block feature set;
    producing a change feature set from said first and second block feature sets of said aligned image blocks;
    decoding and segmenting said aligned image blocks to create a segmented change image block from said change feature set; and
    combining a plurality of said segmented change image blocks into a segmented change image.

7. The method of claim 6, wherein said similarity search is a K nearest neighbor search.

8. The method of claim 7, wherein said similarity search to use one of: Euclidian, cosine, Hamming, and L1 distance metrics.

9. The method of claim 6 wherein said change feature set comprise those of said second block feature sets where changes between said first satellite image and said second satellite image exist.

10. The method of claim 6 wherein said producing is performed on block feature sets of non-anchor image blocks.

* * * * *